United States Patent
Smirnov

(10) Patent No.: US 8,131,400 B2
(45) Date of Patent: Mar. 6, 2012

(54) ADAPTIVE ON-TOOL MASS FLOW CONTROLLER TUNING

(75) Inventor: Alexei V. Smirnov, Fort Collins, CO (US)

(73) Assignee: Hitachi Metals, Ltd., Tokyo (JP)

(*) Notice: Subject to any disclaimer, the term of this patent is extended or adjusted under 35 U.S.C. 154(b) by 153 days.

(21) Appl. No.: 12/797,753

(22) Filed: Jun. 10, 2010

(65) Prior Publication Data

US 2011/0307104 A1 Dec. 15, 2011

(51) Int. Cl.
*G05D 7/00* (2006.01)
*G05B 13/02* (2006.01)

(52) U.S. Cl. ........... 700/282; 700/37; 700/46; 702/50; 702/100; 137/2; 137/486; 73/1.16; 73/861

(58) Field of Classification Search ........... 700/37, 700/46, 282–285; 702/50, 100; 137/2, 14, 137/486, 488; 73/1.16, 861
See application file for complete search history.

(56) References Cited

U.S. PATENT DOCUMENTS

| | | | | |
|---|---|---|---|---|
| 4,877,051 A | * | 10/1989 | Day | 137/486 |
| 4,928,048 A | * | 5/1990 | Doyle | 318/644 |
| 6,036,285 A | * | 3/2000 | Murphy | 303/112 |
| 6,155,283 A | * | 12/2000 | Hansen et al. | 137/1 |
| 6,575,027 B1 | * | 6/2003 | Larsen et al. | 73/204.17 |
| 6,598,617 B2 | * | 7/2003 | Spicer | 137/391 |
| 7,434,477 B2 | * | 10/2008 | Lull et al. | 73/861 |
| 7,603,186 B2 | * | 10/2009 | Smirnov | 700/37 |
| 7,640,078 B2 | * | 12/2009 | Smirnov | 700/282 |
| 7,971,480 B2 | * | 7/2011 | Smirnov et al. | 73/204.23 |
| 2002/0139418 A1 | * | 10/2002 | Tinsley et al. | 137/487.5 |
| 2011/0012588 A1 | | 1/2011 | Fletcher | |
| 2011/0035166 A1 | * | 2/2011 | Henry et al. | 702/48 |
| 2011/0264281 A1 | * | 10/2011 | Smirnov | 700/282 |

* cited by examiner

*Primary Examiner* — Ramesh Patel
(74) *Attorney, Agent, or Firm* — Neugeboren O'Dowd PC; Sean R. O'Dowd

(57) ABSTRACT

One embodiment comprises a method of providing accurate mass flow controller flow rate data for a non-manufacturing-tuning-gas. The mass flow controller may be operated at a setpoint greater than 50%. Data may be recorded to a mass flow controller memory. The setpoint may then be changed to 0%. The recorded data may then be analyzed and one or more non-manufacturing-tuning-gas correction algorithm parameters may be calculated. The one or more non-manufacturing-tuning-gas correction algorithm parameters may be stored in a mass flow controller memory and subsequently used in at least one future mass flow controller operation involving the non-manufacturing-tuning-gas.

18 Claims, 6 Drawing Sheets

ADAPTIVE ON-TOOL MASS FLOW CONTROLLER TUNING

FIELD OF THE INVENTION

The present invention relates generally to mass flow controllers (MFCs). In particular, but not by way of limitation, the present invention relates to methods and systems for optimizing mass flow controller output across gas types and operating conditions.

BACKGROUND OF THE INVENTION

Tuning of mass flow controllers is typically performed by the MFC manufacturer with a calibration gas, typically Nitrogen ($N_2$). Such tuning may be performed in order to develop one or more algorithm parameter coefficients. These parameter coefficients are adapted to be applied to raw MFC data so that the data more accurately reflects the actual flow conditions in the MFC, as compared to the raw MFC data. Often, the obtained parameter coefficients are gas-dependent. Therefore, when the MFC is operating with a gas other than $N_2$, the coefficients may output inaccurate and/or delayed results.

In one such case where a MFC is operating with a non-tuning gas, the MFC may receive a command for a zero setpoint after providing a non-zero setpoint of flow. In such a case, the valve is closed substantially immediately upon receiving such a command, resulting in no net gas flow through the MFC. However, although there is no net gas flow through the MFC itself, the thermal flow sensor is slow in responding to changes in gas flow rates, due to the nature of heat redistribution inside the sensor, the non-zero mass of sensor components, etc. Therefore, the MFC thermal flow sensor provides an inaccurate output that flow is still occurring in the MFC after the zero setpoint command is received. In order to correct for the inaccurate output, one or more digital filters comprising the algorithm parameter coefficients are implemented. As these parameters are calculated during the MFC tuning step described above, the output is only properly corrected for $N_2$ gas. For gases other than $N_2$, the corrected output may overshoot and/or undershoot the zero setpoint. Furthermore, for non-manufacturing-tuning-gasses, the thermal flow sensor may continue to provide output for a substantial period of time after receiving the zero setpoint value, resulting in the output waveform having a "long tail". Due to the inaccurate sensor response, similar errors will be present at other setpoint-to-setpoint flow transitions.

Similarly, when MFC inlet pressure changes, the pressure change may produce a "parasitic flow" in the MFC. Parasitic flow comprises a flow that is internal to the MFC—flowing from a MFC inlet portion to a MFC "dead volume" located between the bypass and the MFC valve. To correct for any flow rate output due to the parasitic flow, data from a MFC pressure sensor and the thermal flow sensor may be used to obtain a MFC correction algorithm comprising one or more digital filters. The correction algorithm may estimate the parasitic flow that is caused by the gas pressure deviation and calculate actual flow rate in the MFC. However, the default parameters of the parasitic flow correction algorithm are obtained using $N_2$ during manufacturer's tuning. Therefore, in MFC processes that use gases other than $N_2$, the parameters in the parasitic flow correction algorithm will not produce accurate flow rate readings. Therefore, in such cases, there is an increase in MFC pressure sensitivity.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

One embodiment of the invention comprises a method of providing accurate mass flow controller flow rate data for a non-manufacturing-tuning-gas. One method comprises operating the mass flow controller with a non-manufacturing-tuning-gas at a setpoint greater than 50%. From the greater than 50% setpoint, the setpoint is subsequently changed to a setpoint of 0%. Data is recorded from the mass flow controller in a mass flow controller memory. This recorded data is analyzed and one or more non-manufacturing-tuning-gas parameters/coefficients are calculated for a correction algorithm. These gas parameters are then stored in the mass flow controller memory and subsequently used in future mass flow controller operations involving the non-manufacturing-tuning-gas in order to provide accurate flow data for the non-manufacturing-tuning-gas.

Another method of providing accurate mass flow controller flow rate data for a non-manufacturing-tuning-gas comprises one of (i) setting the mass flow controller to a zero setpoint and (ii) setting the valve to a zero position while the mass flow controller is in a valve override control mode. At either of these points, when the mass flow controller input pressure fluctuates and a parasitic flow within the mass flow controller is produced, MFC flow rate and pressure data are recorded and stored in a mass flow controller memory. The flow rate data and the pressure data are then analyzed and one or more coefficients for one or more parameters within a parasitic flow correction algorithm for the non-manufacturing-tuning-gas being used in the MFC are calculated. These parameter coefficients are then stored in the mass flow controller memory and used in one or more future mass flow controller operations involving the non-manufacturing-tuning-gas.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

Figure 1:
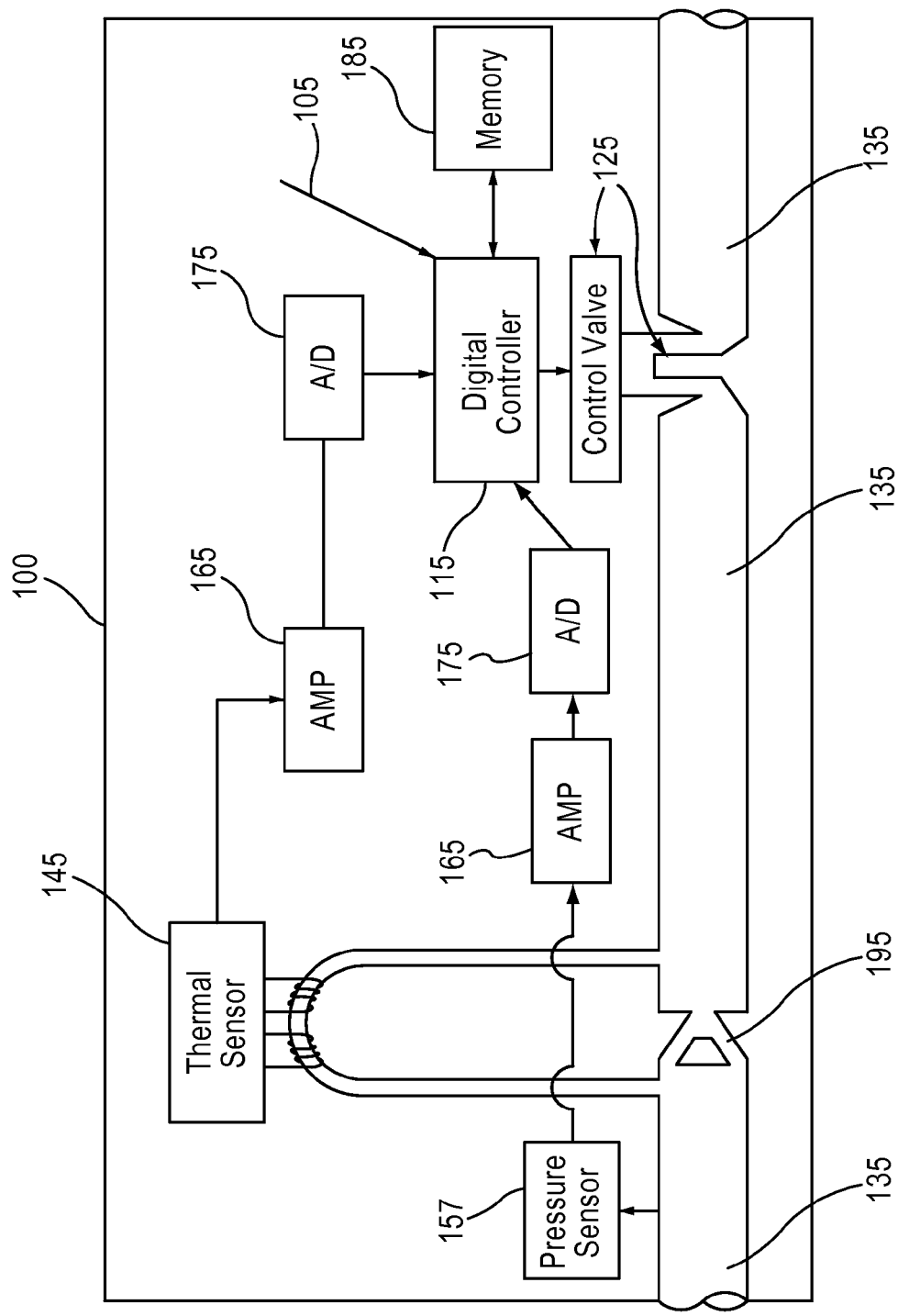
FIG. 1 is a functional block diagram of a mass flow controller in accordance with an illustrative embodiment of the invention.
Figure 2:
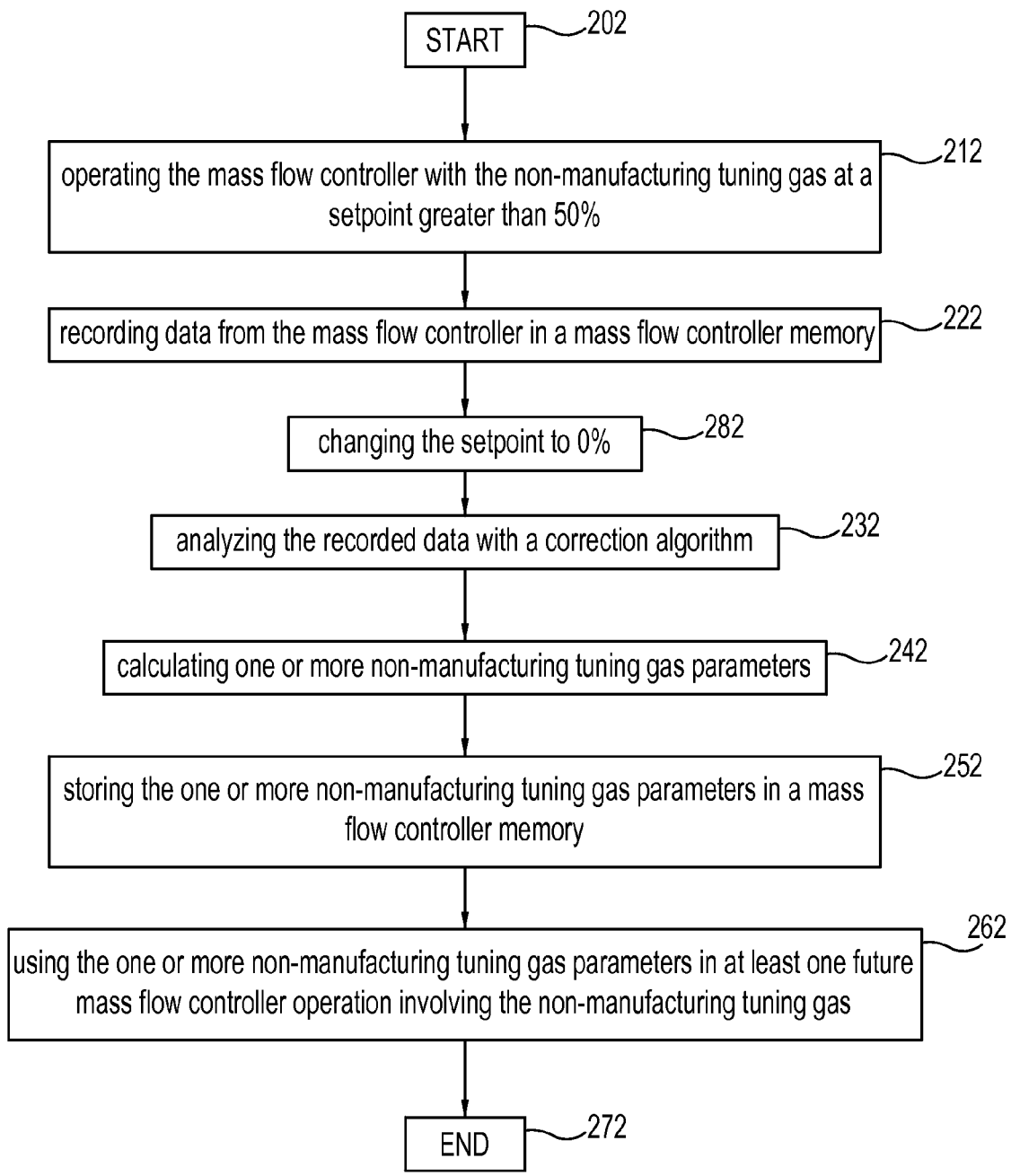
FIG. 2 is a method of providing accurate mass flow controller flow rate data for a non-manufacturing-tuning-gas according to one embodiment of the invention.

Referring now to the drawings, where like or similar elements are designated with identical reference numerals throughout the several views where appropriate, and referring in particular to FIG. 1, a functional block diagram of a mass flow controller (MFC) 100 in accordance with an illustrative embodiment of the invention is shown. FIG. 2 is one embodiment of a method of providing an accurate flow rate for a fluid in the MFC 100 other than the tuning fluid used to establish initial correction algorithm coefficients. The correction algorithm coefficients may also be referred to as digital filters where it is appropriate. To that effect and elsewhere as similarly appropriate, U.S. patent application Ser. No. 12/502,918, filed Jul. 14, 2009, is hereby Incorporated by Reference for all valid purposes. The establishment of the initial correction algorithm coefficients may also be referred to herein and elsewhere as "tuning" the mass flow controller by a manufacturer using a tuning gas or other similarly referenced fluid.

As seen in FIG. 2, one method starts at 202 and at 212 comprises operating the mass flow controller 100 with a non-manufacturing-tuning-gas at a setpoint greater than 50%. For example, as seen in FIG. 1, one embodiment of the MFC 100 may comprise a digital controller 115 that may be adapted to receive an input signal 105. One type of input signal 105 may comprise a setpoint indicator greater than 50%. Upon receiving the setpoint indicator, the digital controller 115 may adjust a control valve 125 so that the rate of fluid flowing through the MFC 100 is substantially equal to the setpoint indicator. In one embodiment a percentage setpoint value may comprise the percentage of the maximum flow rate that the MFC 100 may operate at for certain flow conditions. The thermal sensor 145 and the pressure sensor 155 operatively provide flow rate data and pressure data to the digital controller 115 for control purposes. The flow rate data and pressure data may be operatively provided to the digital controller 115 through one or more amplifiers 165 and analog/digital converters 175. At 222, the flow rate data and pressure data are stored in an internal MFC memory 185 and the data may be stored in a circular manner, whereby old data is overwritten if a 0% setpoint value is not received within a certain time range or data point range (for example after 2s or 2000 data points) after a 50% or greater setpoint value is reached. When a zero setpoint is reached, data may be saved and no longer overwritten. Other setpoint values are also contemplated.

After running the MFC at a setpoint value greater than 50% and recording the flow rate and pressure data in the memory 185, in one method, at 282, the digital controller 115 may receive an input 105 changing the setpoint to a 0% value. The flow rate and pressure data continues to be recorded in the internal memory 185 until the memory is full, or the amount of the data recorded is enough for analysis. At that moment, data recording may stop. Upon changing from a greater than 50% setpoint value to a 0% setpoint value, as seen at 232 and 242 of FIG. 2, the recorded data is analyzed and appropriate coefficient parameter values are calculated for a correction algorithm for the non-manufacturing-tuning-gas. At 252, the parameters are stored in the memory 185.

The correction algorithm is, as similarly described with the "digital filters" portion of the previously referenced U.S. patent application Ser. No. 12/502,918 application, a set of modifiers that are applied to mass flow controller data such as, but not limited to, pressure and flow rate data, in order to change the data from inaccurate data to accurate data for a particular gas and/or flow conditions.

Figure 3A:
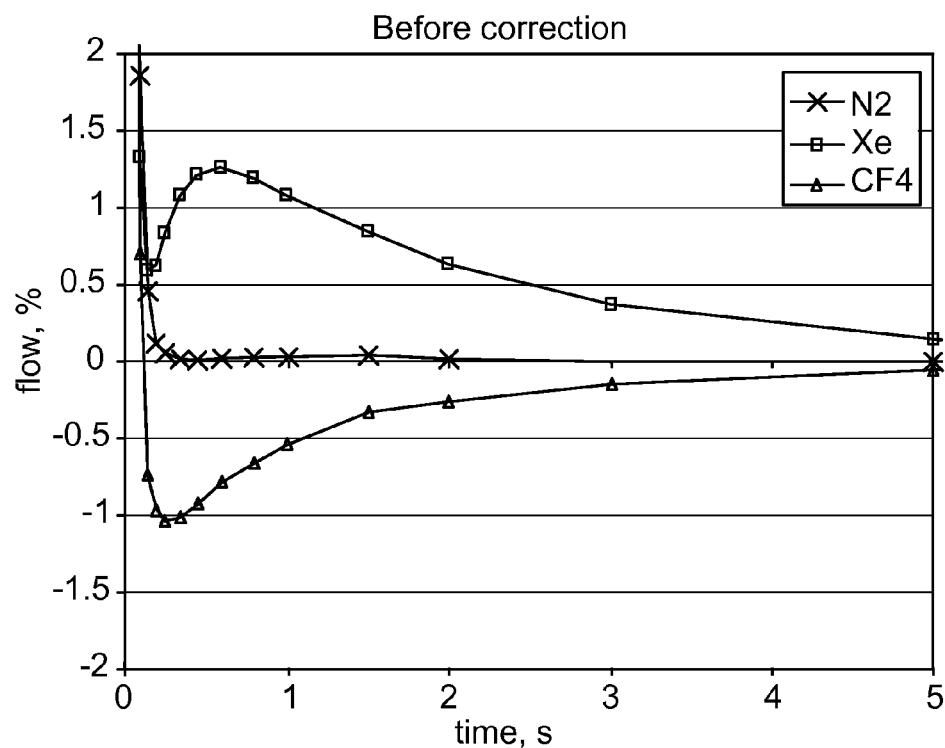
FIG. 3A is a graph of a mass flow controller flow rate as a function of time after a correction algorithm comprising parameters calculated from a tuning gas has been implemented according to one embodiment of the invention.
Figure 3B:
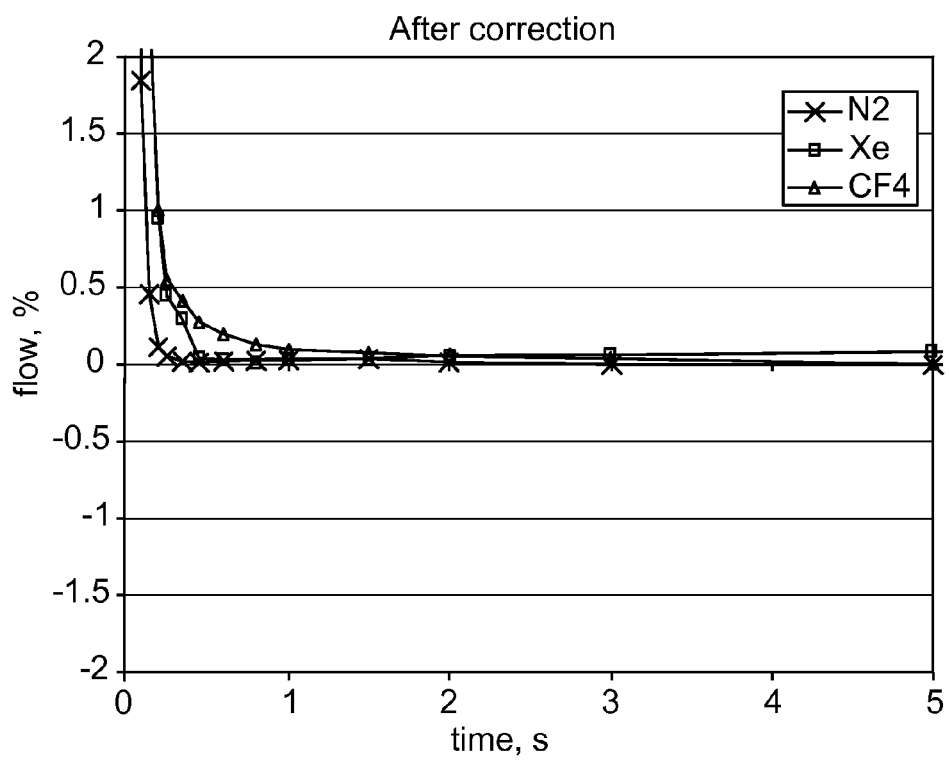
FIG. 3B is a graph of a mass flow controller flow rate as a function of time after a correction algorithm comprising gas-specific parameters has been implemented according to one embodiment of the invention.

One example of how inaccurate data is modified by the correction algorithm to become accurate data is seen in FIGS. 3A and 3B. FIG. 3A shows flow rate data after the correction algorithm is applied to the data, but with the correction algorithm having tuning gas parameter coefficients. As seen, for the gases Xe and $CF_4$, the correction algorithm provides inaccurate data with the tuning gas parameters. However, as seen in FIG. 3B, upon using the flow rate and pressure data for each non-manufacturing-tuning-gas to calculate one or more gas-specific coefficient parameters for the correction algorithm, and applying the algorithm to the flow rate data, accurate gas-specific flow rate data is obtained. These one or more parameters are stored in the mass flow controller memory 185, which may be an on-board MFC memory. The parameters may then be accessed and used in future mass flow controller operations involving the non-manufacturing-tuning-gas, as seen at step 262 of FIG. 2.

One method may be automatically performed by the MFC 100. For example, the process of obtaining and recording the flow rate and pressure data, calculating the gas-specific coefficient parameters, and then subsequently using the gas-specific parameters in a future MFC operation may all occur without any input from the user. For example, in one embodiment, the MFC 100 may receive an input 105 that a new gas other than the MFC tuning gas is being used in a MFC operation. The MFC 100 may be adapted to automatically determine that a non-manufacturing-tuning-gas is being used, or an input 105 from the user may be given that indicates a new gas. In either method, the method steps in FIG. 2 of (i) recording data from the mass flow controller in a mass flow controller memory; (ii) analyzing the recorded data; (iii) calculating one or more non-manufacturing-tuning-gas parameters; (iv) storing the one or more non-manufacturing-tuning-gas parameters in a mass flow controller memory; and (v) using the one or more non-manufacturing-tuning-gas parameters in one or more future mass flow controller operations involving the non-manufacturing-tuning-gas are all automatically performed by the mass flow controller without the need for user input. In other embodiments, one or more of these steps may require input by a user.

Figure 4:
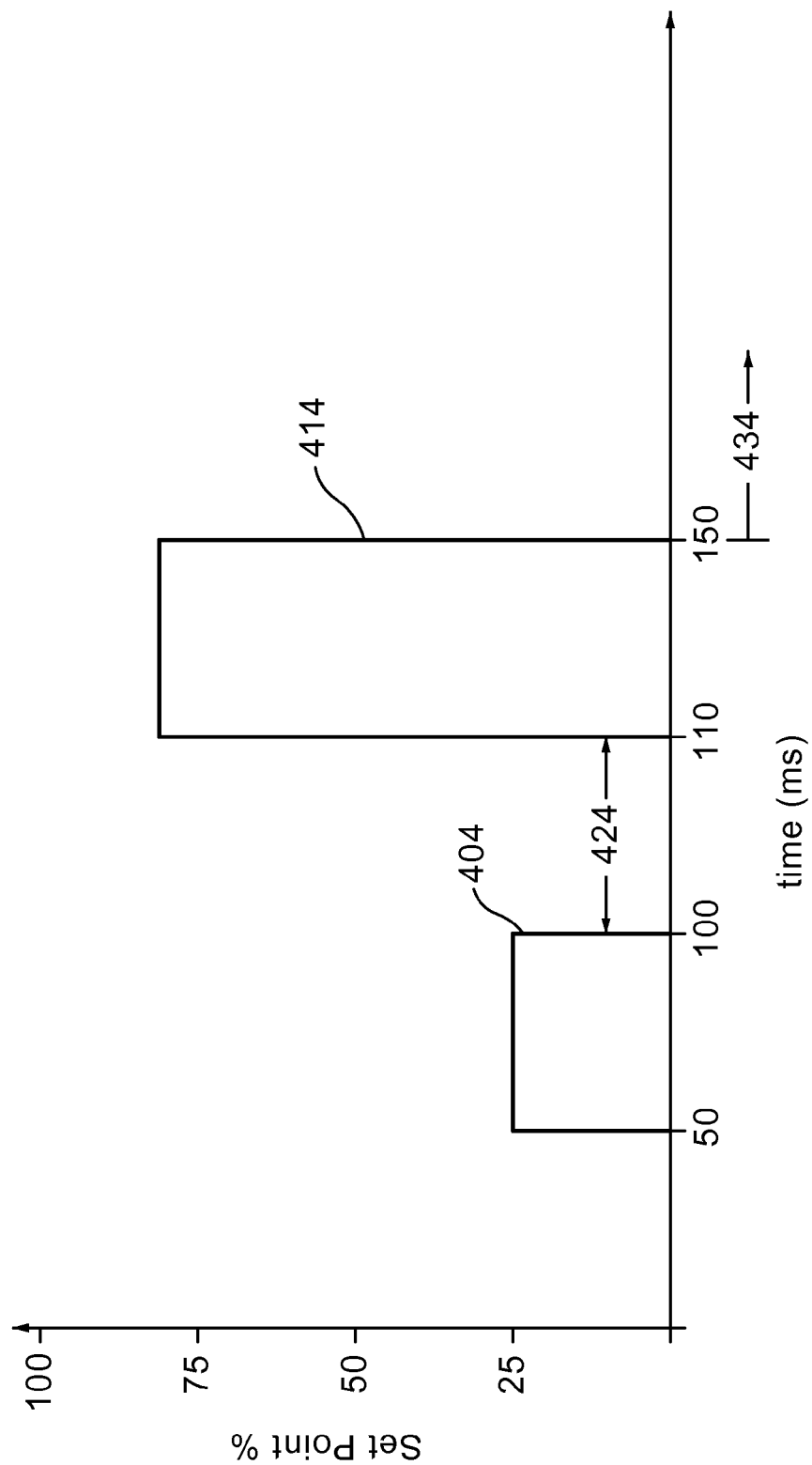
FIG. 4 is a graph of mass flow controller set point values over time for one embodiment of the invention.

Similarly, the same steps of (i)-(v) above may be performed without any indication by the MFC 100 that the MFC 100 is performing the steps, and therefore the accurate data similar to accurate data seen in FIG. 3B may be automatically provided by the MFC 100, transparent to the user. Each of the steps (i)-(v) above may also be performed while the MFC 100 is in an "idle" mode. For example, as seen in FIG. 4, one mass flow controller process comprises a first operations period 404 and a second operations period 414. Each operations period 404, 414 is a period of time where the MFC 100 is supplied with a setpoint greater than 0%. For example, the first operations period 404 has a setpoint of 25% and the second operations period 414 has a setpoint of 75%. Between the first operation period 404 and the second operations period 414 is a first idle mode 424.

As seen in FIG. 4, an idle mode may be a period of time where the MFC 100 is set to a 0% setpoint. As the second operations period comprises a setpoint over 50% and is followed by a 0% setpoint, the steps of (i) recording the mass flow rate and pressure data to the memory; (ii) analyzing the recorded data with a correction algorithm; (iii) calculating one or more non-manufacturing-tuning-gas parameters; and (iv) storing the one or more non-manufacturing-tuning-gas parameters in the mass flow controller memory may be performed during a second idle mode 434. It is to be appreciated that data may also be collected during the second operations period 414. Second operations period 414 data may be saved in the memory 185 by overwriting data previously collected.

The digital controller 115 may comprise one or more of hardware and firmware. In one embodiment the digital controller may comprise firmware and may be adapted to perform the steps of (i) analyzing the recorded data and (ii) calculating one or more non-manufacturing-tuning-gas parameters. Furthermore, flow rate and pressure data may be collected at a recording speed comprising the fastest data recording speed possible in order to obtain the greatest number of data points for a set period of time in order to have the most accurate representation of changes in pressure and flow rate. For example, in one embodiment, the fastest data recordation speed comprises recording at least one data point for every mass flow controller firmware loop cycle. In one embodiment, non-tuning-gas parameters may be obtained upon recording at least 100 data points (samples) for at least one of flow rate and pressure. One type of fluid/gas that may comprise the non-manufacturing-tuning-gas is one of Xenon and Carbon Tetraflouride.

Additionally, one embodiment of the invention may comprise using the data collected to perform troubleshooting or fault-detection on the MFC. For example, data may be saved to the on-board memory 185 and/or may be compared against previously recorded or other data saved to the memory 185 for similar flow conditions. If, for example, the new data is outside of an acceptable range from the data in the memory, a fault condition may be displayed to the user upon determining that the MFC is not operating properly.

Figure 5:
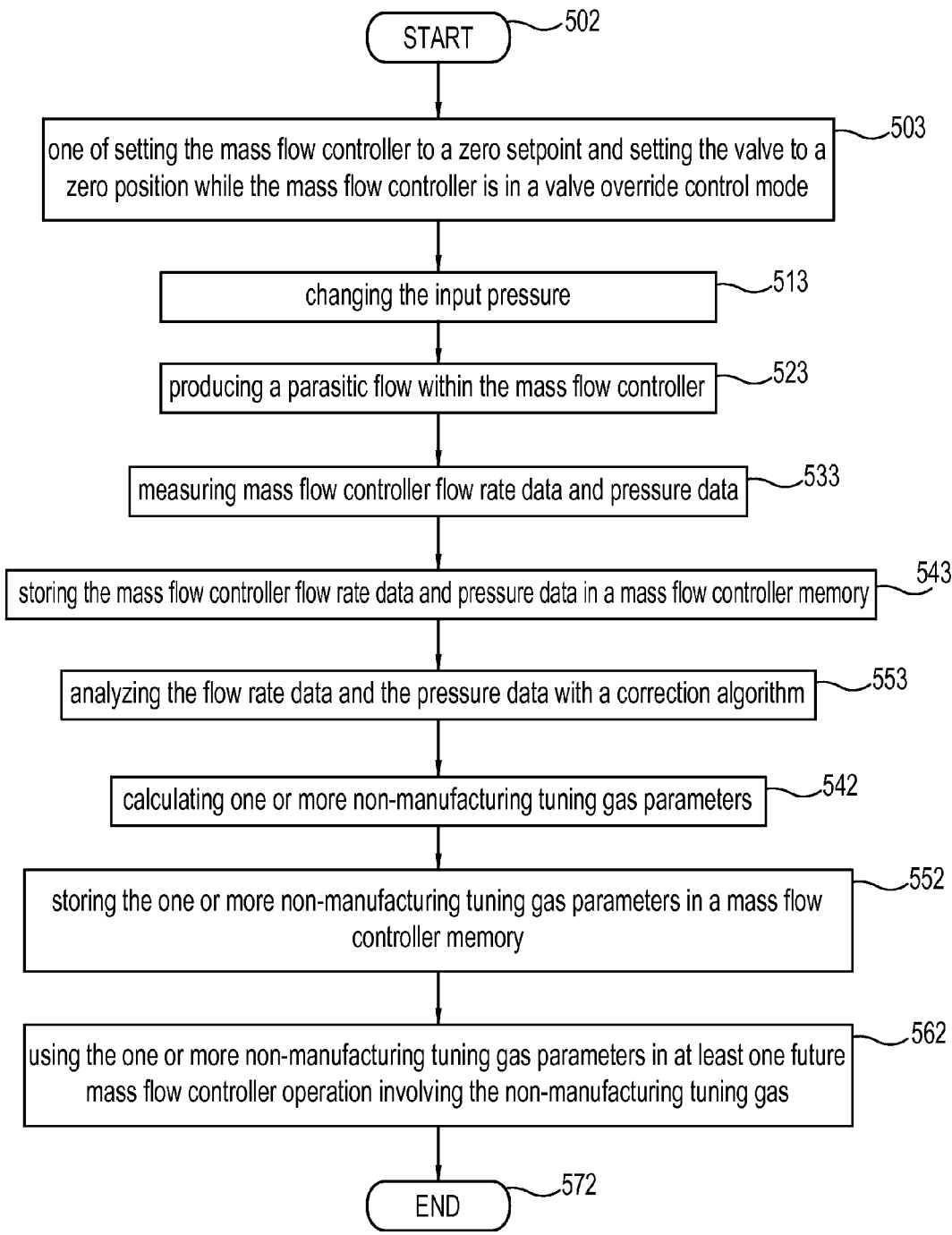
FIG. 5 is a method of providing accurate mass flow controller flow rate data for a non-manufacturing-tuning-gas according to one embodiment of the invention.

As seen in FIG. 5, at 503, another method of providing accurate mass flow controller flow rate data for a non-manufacturing-tuning-gas comprises one of setting the mass flow controller to a zero setpoint and setting the valve to a zero position while the mass flow controller is in a valve override control mode. For example, in one method, the mass flow controller is set to a zero setpoint, initiating the first or second idle modes 424, 434 seen in FIG. 4. At this point, and as seen at element 513 of FIG. 5, one method comprises changing the inlet pressure. For example, the inlet pressure may comprise the pressure in the main flow line 135 upstream of the bypass 195, as seen in FIG. 1. At 523, the method comprises producing a parasitic flow within the mass flow controller 100. For example, one type of parasitic flow may be gas flowing from or to a mass flow controller dead volume. The dead volume may comprise a portion of the main flow line 135 between the bypass 195 and the control valve 125. In one embodiment, the change of pressure at the inlet causes gas to flow past the thermal sensor 145 to or from the dead volume, thereby creating a flow reading in the thermal sensor 145. However, since the control valve 125 is closed, the flow reading is a false reading since the gas never leaves the MFC 100.

At 533 is the method step of measuring mass flow controller flow rate data and pressure data. In one method, the flow rate measurement is operatively provided from the thermal sensor 145 to the digital controller 115. The inlet pressure may be provided by the pressure sensor 155 seen in FIG. 1. The pressure data may also be provided to an amplifier 165 and analog digital converter 175 before it is provided to the digital controller 115 and stored in the on-board MFC memory 185, as seen in element number 543 of FIG. 5. The flow rate data and the pressure data may then be analyzed and one or more non-manufacturing-tuning-gas parameters may be calculated for use with a correction algorithm, as seen in elements 553 and 542 of FIG. 5.

Figure 6A:
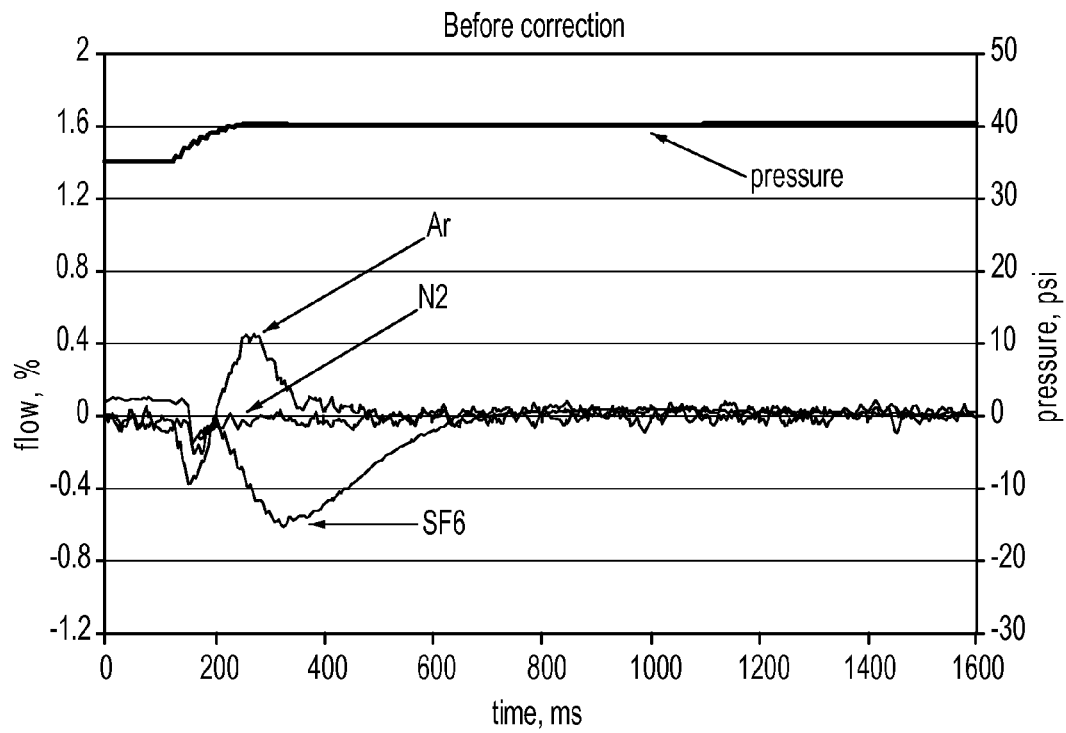
FIG. 6A is a graph of a mass flow controller flow rate as a function of time after a change in pressure occurs at a 0% setpoint, using a correction algorithm having parameters calculated with a tuning gas according to one embodiment of the invention.
Figure 6B:
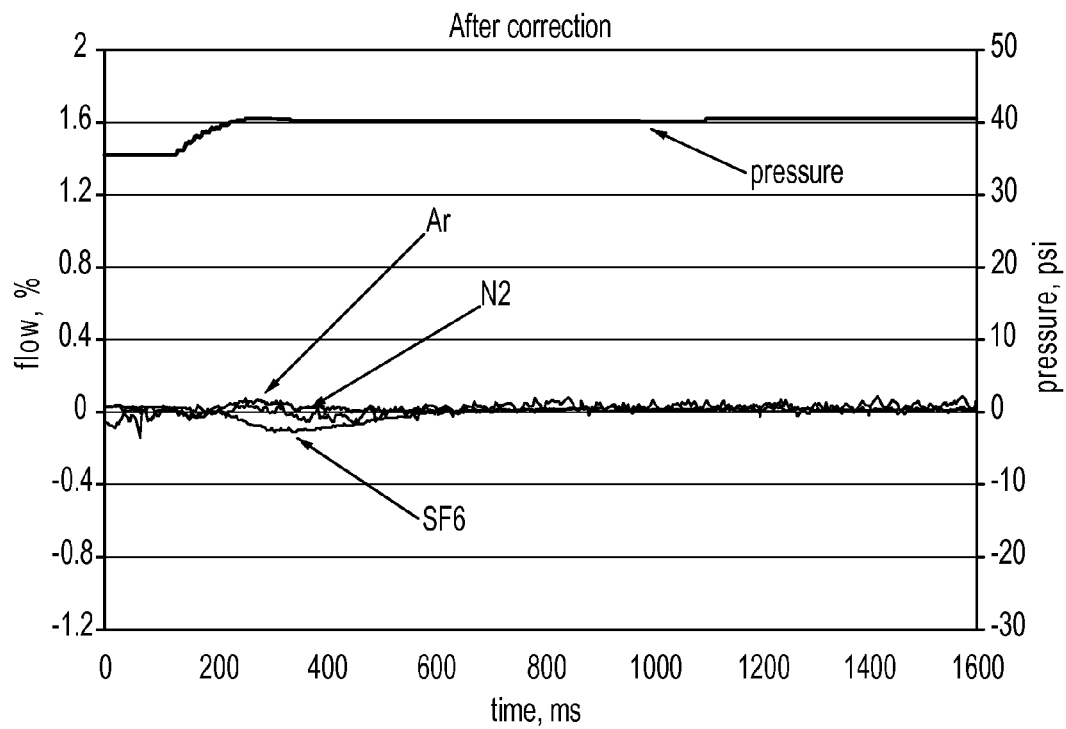
FIG. 6B is a graph of a mass flow controller flow rate as a function of time after a change in pressure occurs at a 0% setpoint, using a correction algorithm having parameters calculated with a non-manufacturing tuning gas according to one embodiment of the invention.

Seen in FIG. 6A is the flow rate as measured by the MFC 100 upon a change in pressure with a closed valve, after applying a correction algorithm calculated with the tuning gas, $N_2$, for three gas types. Upon applying the correction algorithm comprising one or more gas-specific coefficients, the flow rate graph of FIG. 6B is obtained. As seen, using one or more gas-specific coefficients provides for a more accurate MFC output. The correction algorithm used to obtain the graph of FIG. 6B may use different digital filters/parameter coefficients than were used for similar flow conditions to obtain the graph of FIG. 3B described above. The one or more non-manufacturing-tuning-gas parameters used for FIG. 6B are stored in the mass flow controller memory 185, are retrieved from, and are used in at least one future mass flow controller operation involving the non-manufacturing-tuning-gas, as seen at elements 552 and 562 of FIG. 5.

In one embodiment, the parasitic flow comprises a flow having at least a 5% controller full scale flow. Additionally, one method comprises changing the input pressure through at least one of a pressure spike and a pressure change. A pressure spike may comprise a temporary increase or decrease in pressure while a pressure change may comprise a non-temporary change in pressure similar to the change in pressure seen in FIGS. 6A and 6B. Furthermore, similar to the method described above with regards to FIGS. 3A and 3B, data is recorded prior to the pressure changes. If, during idle periods 424, 434, no pressure change occurs, the data recorded to the memory may be overwritten with data occurring in a subsequent idle period 424, 434, with data occurring later in the same idle period, or with data from a subsequent period of operation. For example, if, after 2 seconds of idle time or after 100 data samples no pressure change occurs, data in the memory 185 may be overwritten. In one embodiment, pressure may change, but the pressure only provides a change in the flow rate that is within an acceptable range. For example, if the acceptable range is +/−0.15% setpoint and a change in pressure only produces a setpoint flow rate change of 0.1%, no new coefficients for the correction algorithm may be calculated. In such a case, the collected data may be overwritten with subsequent data.

In other methods, it may be determined that the pressure change causes an adjusted flow rate that is outside of a specified flow rate range. In one embodiment, the adjusted flow rate may comprise the flow rate as calculated by the correction algorithm using the tuning-gas coefficient parameters. In such a case where the adjusted flow rate is outside of an acceptable range, one or more non-manufacturing-tuning-gas parameters are calculated using the pressure data and flow rate data. Or, the parameters developed for the manufacturing-tuning-gas may be adjusted using the pressure data and flow rate data so that the parameters provide accurate flow rate data for the non-manufacturing-tuning-gas. The new parameters or the adjustment of the tuning gas parameters may occur when the pressure is changed by an amount adapted to create a measurable flow rate reading outside of the flow rate reading threshold.

What is claimed is:

1. A method of providing mass flow controller flow rate data for a non-manufacturing-tuning-gas comprising,
operating the mass flow controller with the non-manufacturing-tuning-gas at a setpoint greater than 50%;
recording data from the mass flow controller in a mass flow controller memory;
changing the setpoint to 0%;
analyzing the recorded data;
calculating one or more non-manufacturing-tuning-gas correction algorithm parameters;
storing the one or more non-manufacturing-tuning-gas correction algorithm parameters in a mass flow controller memory; and
using the one or more non-manufacturing-tuning-gas correction algorithm parameters in at least one future mass flow controller operation involving the non-manufacturing-tuning-gas.

2. The method of claim 1 wherein, the steps of, recording data from the mass flow controller in a mass flow controller memory, analyzing the recorded data, calculating one or more non-manufacturing-tuning-gas correction algorithm parameters, storing the one or more non-manufacturing-tuning-gas correction algorithm parameters in a mass flow controller memory, and using the one or more non-manufacturing-tuning-gas correction algorithm parameters in at least one future mass flow controller operation involving the non-manufacturing-tuning-gas are automatically performed by the mass flow controller.

3. The method of claim 2 wherein, the steps of, recording data from the mass flow controller in a mass flow controller memory, analyzing the recorded data, calculating one or more non-manufacturing-tuning-gas correction algorithm parameters, storing the one or more non-manufacturing-tuning-gas correction algorithm parameters in a mass flow controller memory, and using the one or more non-manufacturing-tuning-gas correction algorithm parameters in at least one future mass flow controller operation involving the non-manufacturing-tuning-gas are performed by the mass flow controller transparent to a mass flow controller user.

4. The method of claim 1 wherein, the steps of, recording data from the mass flow controller in a mass flow controller memory, analyzing the recorded data, calculating one or more non-manufacturing-tuning-gas correction algorithm parameters, and storing the one or more non-manufacturing-tuning-gas correction algorithm parameters in a mass flow controller memory are performed by the mass flow controller while the mass flow controller is in an idle mode.

5. The method of claim 1 wherein, the steps of analyzing the recorded data and calculating one or more non-manufacturing-tuning-gas correction algorithm parameters are performed by a mass flow controller firmware.

6. The method of claim 5 wherein, the data is recorded at a fastest data recordation speed allowed by the mass flow controller.

7. The method of claim 6 wherein, the fastest data recordation speed allowed by the mass flow controller comprises recording at least one data point for every mass flow controller firmware loop cycle.

8. The method of claim 1 wherein, the recorded data comprises at least 100 data samples.

9. The method of claim 1 wherein, analyzing the recorded data comprises at least one of,
comparing the recorded data with a separate dataset and determining that the mass flow controller is not operating properly; and
comparing newly calculated gas-specific correction algorithm parameters with previously calculated gas-specific correction algorithm parameters and determining if the difference between the two parameter values exceeds some specified threshold.

10. A method of providing accurate mass flow controller flow rate data for a non-manufacturing-tuning-gas comprising,
one of setting the mass flow controller to a zero setpoint and setting the valve to a zero position while the mass flow controller is in a valve override control mode;
changing the input pressure;
producing a parasitic flow within the mass flow controller;
measuring mass flow controller flow rate data and pressure data;
storing the mass flow controller flow rate data and pressure data in a mass flow controller memory;
analyzing the flow rate data and the pressure data;
calculating one or more non-manufacturing-tuning-gas correction algorithm parameters;
storing the one or more non-manufacturing-tuning-gas correction algorithm parameters in a mass flow controller memory; and
using the one or more non-manufacturing-tuning-gas correction algorithm parameters in at least one future mass flow controller operation involving the non-manufacturing-tuning-gas.

11. The method of claim 10 wherein, the parasitic flow comprises at least a 5% controller full scale flow.

12. The method of claim 10 wherein, the input pressure is changed through at least one of a pressure spike and a non-temporary pressure change.

13. The method of claim 10 wherein, at least one of the pressure data and flow rate data is overwritten with at least one of subsequent pressure data and flow rate data if an input pressure change is not detected within a specified range.

14. The method of claim 10 wherein, at least one of the pressure data and flow rate data is overwritten with at least one of subsequent pressure data and flow rate data if an adjusted flow rate is not outside of a specified flow rate range.

15. The method of claim 10, further comprising,
determining that an adjusted flow rate is outside of a specified flow rate range; and wherein,
calculating one or more non-manufacturing-tuning-gas correction algorithm parameters comprises using the pressure data and flow rate data to one of,
calculate new non-manufacturing-tuning-gas correction algorithm parameters, and
adjust current manufacturing-tuning-gas correction algorithm parameters.

16. The method of claim 10 wherein, the pressure is changed by an amount adapted to create a measurable flow rate reading outside a flow rate reading threshold.

17. A method of providing accurate mass flow controller flow rate data for a non-manufacturing-tuning-gas comprising,
operating the mass flow controller with the non-manufacturing-tuning-gas at a setpoint greater than 50%;
recording flow rate data from the mass flow controller in a mass flow controller memory;
recording pressure data from the mass flow controller in a mass flow controller memory;
changing the setpoint to 0%;
changing the input pressure;
producing a parasitic flow within the mass flow controller;
analyzing the recorded data with a correction algorithm;

calculating one or more non-manufacturing-tuning-gas parameters;

storing the one or more non-manufacturing-tuning-gas parameters in a mass flow controller memory; and using the one or more non-manufacturing-tuning-gas parameters in at least one future mass flow controller operation involving the non-manufacturing-tuning-gas.

18. A mass flow controller adapted to receive a fluid other than the fluid used to determine correction algorithm parameters comprising, a main flow line;
a thermal sensor operatively coupled to the main flow line;
a pressure sensor operatively coupled to the main flow line;
a control valve operatively coupled to the main flow line;
a memory device;
a digital controller electrically coupled to the memory device, operatively coupled to the control valve, and adapted to, receive pressure data from the pressure sensor,
receive flow rate data the thermal sensor,
analyze the pressure data and flow rate data;
calculate one or more gas-specific parameters for an algorithm adapted to be applied to the flow rate data when at least one of,
a flow rate setpoint is changed from greater than 50% to 0%, and
a mass flow controller pressure fluctuates when the setpoint comprises 0%.

* * * * *